United States Patent [19]

Wengrovius et al.

[11] Patent Number: 5,180,801
[45] Date of Patent: Jan. 19, 1993

[54] HEAT CURABLE EPOXY COMPOSITIONS

[75] Inventors: Jeffrey H. Wengrovius, Scotia; Virginia M. Van Valkenburgh, East Nassau, both of N.Y.

[73] Assignee: General Electric Company, Schenectady, N.Y.

[21] Appl. No.: 754,100

[22] Filed: Sep. 3, 1991

[51] Int. Cl.$^5$ .................... C08G 77/06; C08G 77/04; C08G 77/00
[52] U.S. Cl. ..................................... 528/15; 528/27; 528/37; 528/40
[58] Field of Search ....................... 528/15, 27, 37, 40

[56] References Cited

U.S. PATENT DOCUMENTS

| | | | |
|---|---|---|---|
| 3,814,730 | 6/1974 | Karstedt | 528/15 |
| 4,279,717 | 9/1981 | Eckberg et al. | 528/27 |
| 4,421,904 | 12/1983 | Eckberg et al. | 528/15 |
| 4,565,859 | 1/1986 | Murai et al. | 525/481 |
| 4,618,666 | 10/1986 | Porte et al. | 528/33 |
| 4,912,188 | 3/1990 | Colas et al. | 525/476 |
| 5,034,489 | 7/1991 | Wengrovius et al. | 528/21 |

OTHER PUBLICATIONS

Chemical Abstracts, 15303 and 15304, vol. 59—Preparation of linear cyclic or cagelike methyl silicon telomers having a framework of —SiSiO—, Makoto Kumada et al.

Article—Poly(oxymultisilane)s by ring-opening polymerization—Fully methylated silicon analogues of oxirane and THF polymers, Julian Chojinowski et al—Polish Academy of Sciences, Boczna 5, Poland—Feb. 10, 1988—pp. 469-475.

Article—J. Org. Chem. 1956(21)—Synthesis of Some Methyldisilanes Containing Functional Groups Makoto Kumada et al.—Received May 23, 1958—pp. 1264-1268.

Primary Examiner—Melvyn I. Marquis
Assistant Examiner—Karen A. Dean
Attorney, Agent, or Firm—William A. Teoli; William H. Pittman

[57] ABSTRACT

A polysilanesiloxane such as a cyclic dimer of disilanesiloxane has been found to be useful in promoting the thermal cure of epoxides such as silicone epoxides. Enhancement in the rate of thermal cure of the epoxy compositions containing such polysilanesiloxanes can be effected with an effective amount of a platinum catalyst.

8 Claims, No Drawings

HEAT CURABLE EPOXY COMPOSITIONS

BACKGROUND OF THE INVENTION

The present invention relates to the use of a polysilanesiloxane in epoxy resins to produce heat curable epoxy compositions. More particularly, the present invention relates to the use of such polysilanesiloxane in combination with an effective amount of a platinum hydrosilylation catalyst which can enhance the rate of cure of the resulting heat curable epoxy compositions.

Prior to the present invention, as shown by Crivello, U.S. Pat. No. 4,173,551, heat curable epoxy compositions were provided employing a diaryliodonium salt initiator in combination with a copper salt. Polymerization of epoxy resins, for example, epoxy functional siloxanes are also shown in copending application Ser. No. 07/473,802, filed Feb. 2, 1990, assigned to the same assignee as the present invention. As taught in 07/473,802, cure of epoxy compounds also can be effected utilizing a platinum catalyst and a silicon hydride. Additional procedures for effecting the cure of certain epoxy resins, such as epoxysiloxanes, are shown by E. P. Plueddemann et al, Jour. of Amer. Chem. Soc., Volume 81, 2632-2635 (1959).

Although several procedures are available for effecting the thermal cure of epoxy resins, new methods are constantly being investigated to develop compositions having an extended shelf life at ambient temperatures which are curable within a reasonable time at temperatures less than 200° C.

SUMMARY OF THE INVENTION

The present invention is based on a discovery that heat curable epoxy compositions are provided having an extended shelf life at ambient temperatures by utilizing an epoxy resin, and preferably, an epoxy functional siloxane in combination with an effective amount of a polysilanesiloxane, such as a cyclic dimer having the formula,

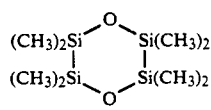 (1)

Additional polysilanesiloxanes are shown by Porte, U.S. Pat. No. 4,618,666, where methylsilicon resins having disilanoxy groups are made by directly hydrolyzing methylchlorosilane synthesis residue consisting essentially of tetrachloro-1,2-dimethyldisilane, trimethyl-1,1,2-trichlorodisilane, tetramethyl-1,2-dichlorodisilane and dimethyldichlorosilane.

In addition to the cyclic disilanesiloxane of formula (1), or methylchlorosilane synthesis residue, it has been found that an effective amount of a platinum catalyst in combination with polysilanesiloxane can enhance the cure rate of the resulting heat curable epoxy composition. For example, cures of 100°-125° C. are attainable with platinum catalyst, while a temperature of 200° C. can be required in the absence of platinum.

STATEMENT OF THE INVENTION

There is provided by the present invention, heat curable epoxy compositions comprising by weight, (A) 100 parts of an epoxy resin, and (B) 0.1 to 25 parts of a polysilanesiloxane comprising chemically combined polysilyloxy groups.

Some of the polysilanesiloxane comrise tetraorganodisilyloxy groups of the formula,

 (2)

where R is a member selected from the class consisting of the same or different monovalent $C_{(1-14)}$ hydrocarbon radicals and $C_{(1-14)}$ hydrocarbon radicals substituted with monovalent radicals inert during equilibration. However, since methylchlorosilane synthesis residue can be used as the polysilanesiloxane and in view of the fact that a wide variety of hydrolysis products can be formed during the hydrolysis of such synthesis residue, the pclysilanesiloxane useful in the practice of the invention also includes silicone soluble resin having such structures as $$\begin{array}{c} X\ \ X \\ |\ \ \ | \\ X-Si-Si-X, \\ |\ \ \ | \\ X\ \ X \end{array}$$

where X is selected from O, R and Si, which can be derived from the hydrolysis of materials such $$\begin{array}{cc} \begin{array}{c} CH_3\ \ CH_3 \\ |\ \ \ \ | \\ Cl-Si-\!\!-\!\!-Si-CH_3 \\ |\ \ \ \ | \\ Cl\ \ \ Cl \end{array} & \text{and} & \begin{array}{c} Cl\ \ Cl \\ |\ \ | \\ CH_3-Si-Si-CH_3. \\ |\ \ | \\ Cl\ \ Cl \end{array} \end{array}$$

Radicals included within R of formula are (2), for example, $C_{(1-8)}$ alkyl radicals such as methyl, ethyl, propyl, butyl, pentyl; alkenyl radicals such as vinyl, propenyl and cyclohexenyl; substituted alkyl radicals such as trifluoropropyl, cyanoethyl and cyanopropyl; $C_{(6-14)}$ aryl radicals such as phenyl, tolyl, xylyl, and halogenated derivatives thereof, such as nitrophenyl and chlorophenyl.

The term "epoxy resin" as utilized in the description of the present invention, includes any monomeric, dimeric or oligomeric or polymeric epoxy material containing one or a plurality of epoxy functional groups, For example, those resins which result from the reaction of bisphenol A (4,4'-isopropylidenediphenol) and epichlorohydrin, or by the reaction of low molecular weight phenolformaldehyde resin (Novolak resin) with epichlorohydrin, can be used alone or in combination with an epoxy containing compound as a reactive diluent. Such diluents as phenyl glycidyl ether, 4-vinylcyclohexene dioxide, limonene dioxide, 1,2-cyclohexene oxide, glycidyl acrylate, glycidyl methacrylate, styrene oxide, allyl glycidyl ether, etc., may be added as viscosity modifing agents.

In addition, epoxy resins can be extended to include polymeric materials containing terminal or pendant epoxy groups. Examples of these compounds are vinyl copolymers containing glycidyl acrylate or methacrylate as one of the comonomers. Other classes of epoxy containing polymers are epoxysiloxane resins, epoxypolyurethanes and epoxy-polyesters. Such polymers usually have epoxy functional groups at the ends of their chains. As described in the literature, epoxy resins can also be modified in a number of standard ways such as reaction with amines, carboxylic acids, thiols, phenols, alcohols, etc., as shown in U.S. Pat. Nos. 2,935,488; 3,235,620; 3,369,055; 3,379,653; 3,398,211; 3,403,199; 3,563,840; 3,567,797; 3,677,995; etc. Further coreactants which can be used with epoxy resins are hydroxy terminated flexibilizers such as hydroxy terminated polyesters, shown in the Encyclopedia of Polymer Science and Technology, Vo. 6, 1967, Interscience Publishers, N.Y., pp. 209–271 and particularly p. 238.

Epoxysiloxanes used in the practice of the present invention can be made by effecting reaction between epoxide monomers having ethylenic unsaturation and an organohydrogen siloxane in the presence of a catalytic amount of a precious metal such as a platinum catalyst. Included within the ethylenically unsaturated epoxy monomers which can be employed to make are commercially available materials such as 1-methyl-4-isopropenylcyclohexeneoxide, 2,6-dimethyl-2,3-epoxy-7-octene, and 1,4-dimethyl-4-vinylcyclohexeneoxide. Vinyl cyclohexeneoxide is the preferred ethylenically unsaturated epoxide which can be used.

Addition between the ethylenically unsaturated epoxide and the SiH functional groups of the organohydrogensiloxane can be effected in accordance with the procedure shown by Eckberg U.S. Pat. No. 4,279,717, employing an effective amount of a platinum metal catalyst. The epoxysiloxanes, can include various organohydrogenpolysiloxanes which preferably are methylhydrogenpolysiloxane fluids. For example, there can be used a methylhydrogenpolysiloxane having a chain length of about 100 chemically combined siloxy units consisting essentially of about 90 mole percent of dimethylsiloxy units and 8 mole percent of methylhydrogensiloxy units, and chain-stopped with dimethylhydrogensiloxy units. In instances where higher mole percents of epoxy functionality are desired, methylhydrogenpolysiloxane having a shorter chain length of methylhydrogensiloxy units and dimethylsiloxy units and optionally having dimethylhydrogensiloxy chain-stopping units can be used. In instances where lower mole percents of epoxy functionality in the epoxy silicone are desired, methylhydrogenpolysiloxanes having longer chain lengths can be employed.

The catalyst which can be used to enhance the cure of the epoxy resin may be any suitable platinum catalyst. Such catalysts are well known in the art. Examples of suitable catalysts are taught by Lamoreaux in U.S. Pat. No. Nos. 3,917,432; 3,197,433; and 3,200,972; and by Karstedt in U.S. Pat. Nos. 3,715,334 and 3,814,730; and by Ashby et al in U.S. Pat. No. 4,288,345; hereby incorporated by reference. The preferred catalysts are those described in the Lamoreaux and Karstedt patents. The catalyst described in the patents to Lamoreaux is a complex formed from chloroplatinic acid with up to 2 moles per gram of platinum of a member selected from the class consisting of alcohols, ethers, aldehydes and mixtures of the above.

The platinum catalyst disclosed in the patent to Karstedt, U.S. Pat. No. 3,814,730 is a platinum-siloxane complex containing less than about 0.1 gram atom of halogen per gram atom of platinum. It is prepared by reacting a platinum halide, preferably chloroplatinic acid, and an unsaturated siloxane, preferably symtetramethyldivinyldisiloxane, and is sometimes referred to herein as "Karstedt's catalyst."

The platinum catalyst can be present in an amount sufficient to provide at least one part by weight of platinum for every one million parts by weight of heat curable epoxy composition. It is preferred to use sufficient catalyst so that there is present from 5 to 50 parts by weight platinum per million parts by weight of heat curable epoxy composition. Most preferably, the platinum catalyst is present in an amount sufficient to provide about 5 to about 10 parts by weight of platinum per million parts by weight of heat curable epoxy composition.

In order that those skilled in the art will be better able to practice the present invention, the following examples are given by way of illustration and not by way of limitation. All parts are by weight unless otherwise indicated.

EXAMPLE 1

Several heat curable epoxy mixtures were prepared by blending a silicone polymer with pendent cyclohexene oxide groups (about 1 mole of the epoxide per 921 grams of polymer) with the cyclic dimer of formula (1). Some of the heat curable mixtures were prepared using an effective amount of platinum catalyst. In preparing the mixtures, there was used 10 grams of the silicone polymer and 0.1 g of cyclic dimer of formula (1), and 100 ppm of Pt catalyst in the form of a complex shown by Ashby, U.S. Pat. No. 3,154,601. It was found that the cyclic dimer readily dissolved in the silicone polymer which was a fluid having a viscosity of 200 centipoises at 25° C. The heat curable mixtures are shown as follows:

|  | 1 | 2 | 3 | 4 |
| --- | --- | --- | --- | --- |
| epoxy siloxane | 10 g | 10 g | 10 g | 10 g |
| cyclic dimer of formula 1 | — | 0.1 g | — | 0.1 g |
| Pt catalyst | — | — | 100 ppm | 100 ppm |

The above mixtures were heated in open containers for 15 minutes at 50° C., 100° C. and 200° C. It was found that mixture #4 cured within 15 minutes at 100° C., and mixture #2 cured after 15 minutes at 200° C. The remaining mixtures did not cure under the aforementioned conditions.

EXAMPLE 2

Several heat curable epoxy mixtures were prepared using the silicone polymer of example 1 and the cyclic dimer of formula (1). The heat curable epoxy compositions had a molar ratio of epoxide/Si-SiO bonds of 1:1, 2:1, 4:1, 8:1, and 16:1. In preparing the compositions, there was used 10 grams of the silicone polymer, per 1.4 grams, 0.7 grams, 0.35 grams, 0.18 grams and 0.09 grams respectively of the cyclic dimer. It was found that the cyclic dimer readily dissolved in the silicone polymer which was a fluid having a viscosity of 200 centipoises at 25° C.

There was added to each of the mixtues of silicone polymer and cyclic silicone dimer, 100 ppm of platinum in the form of a complex as shown by Ashby, U.S. Pat. No. 3,159,601. Portions of each of the respective compositions were then placed in open containers and heated to 125° C. It was found that all of the respective curable compositions cured within 5 minutes to the elastomeric state. Portions of the respective curable compositions were also stored at 25° C. to test for shelf stability. It was found that the composition having a 1:1 ratio of epoxide/Si remained a liquid for 24 hours before forming a hard crosslinked polymer. The curable composition having a 2:1 ratio cured after 48 hours at 25° C.; the composition having a 4:1 ratio cured after 1 month, while the remaining materials had a shelf life greater than 6 months under ambient conditions.

EXAMPLE 3

A disilanoxy containing hydrolysis product was obtained by hydrolyzing 200 grams of a secondary chlorosilane residue obtained from a methylchlorosilane reactor in 1 liter of a 1:1 water/diethylether mixture cooled in an ice bath. There was added to the resulting mixture sufficient aqueous sodium hydroxide to neutralize the HCl formed during the hydrolysis. Methyl orange was used to indicate when the pH was neutral. After stirring at 25° C. for 12 hours, the ether phase of the reaction mixture was separated from the water phase. The ether solution was dried over magnesium sulfate. There was obtained 138 grams of a disilanoxy hydrolyzate in the form of an oil after the solvent was removed in vacuo.

Several heat curable epoxy compositions were prepared following the procedure of Example 2, except equal weight amounts of the above disilanoxy hydrolyzate were substituted for the cyclic dimer. There was added to each of the mixtures of silicone polymer and disilanoxy hydrolyzate, 100 ppm of platinum in the form of a complex as shown by Karstedt, U.S. Pat. No. 3,775,452. Portions of each of the respective compositions were then placed in open containers and heated to 125° C. All compositions cured to an elastomer in 5 minutes, and it was further found that these curable compositions had the same shelf stability as those described in Example 2.

Although the above examples are directed to only a few of the very many variables which can be used in the practice of the present invention, it should be understood that the present invention is directed to a much broader variety of heat curable compositions as set forth in the description preceeding these examples.

What is claimed is:

1. A heat curable epoxy composition comprising by weight,
   (A) 100 parts of an epoxy resin, and
   (B) 0.1 to 25 parts of a polysilanesiloxane comprising chemically combined polysilyloxy groups.

2. A heat curable epoxy composition comprising by weight,
   (A) 100 parts of an epoxy resin, and
   (B) 0.1 to 25 parts of a polysilanesiloxane having chemically combined tetraorganodisilyloxy groups of the formula,

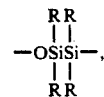

where R can be the same or different and is a member selected from the class consisting of monovalent $C_{(1-14)}$ hydrocarbon radicals and $C_{(1-14)}$ hydrocarbon radicals substituted with monovalent radicals inert during equilibration.

3. A heat curable composition in accordance with claim 1, containing 5 to 50 parts by weight of platinum per million parts by weight of heat curable epoxy composition.

4. A heat curable epoxy composition in accordance with claim 1, where the epoxy resin is an epoxy silicone resin.

5. A heat curable epoxy composition in accordance with claim 4, where the epoxy silicone resin is a polydimethylsiloxane having pendent cyclohexene oxide groups.

6. A heat curable epoxy composition in accordance with claim 2, where the polysilanesiloxane is

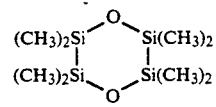

7. A heat curable epoxy composition in accordance with claim 1, where the polysilanesiloxane is a hydrolyzate from methylchlorosilane synthesis residue.

8. A heat curable composition in accordance with claim 3, where the platinum catalyst is a platinum-siloxane complex.

* * * * *